(12) United States Patent
Lu (10) Patent No.: US 7,175,375 B2
(45) Date of Patent: Feb. 13, 2007

(54) STRUCTURE OF A SPINDLE OF A MACHINING CENTER

(75) Inventor: Yung-Hsiang Lu, Chiayi (TW)

(73) Assignee: Factory Automation Technology Co., Ltd., Chiayi (TW)

( * ) Notice: Subject to any disclaimer, the term of this patent is extended or adjusted under 35 U.S.C. 154(b) by 513 days.

(21) Appl. No.: 10/827,266

(22) Filed: Apr. 20, 2004

(65) Prior Publication Data

US 2005/0232720 A1 Oct. 20, 2005

(51) Int. Cl.
*B23Q 3/12* (2006.01)

(52) U.S. Cl. ....................... 409/233; 279/134

(58) Field of Classification Search ............... 409/231, 409/233; 279/134, 135, 146; *B23C 1/02, B23C 1/025, 1/027, 1/06, 5/26; B23Q 3/12; B23B 31/24, B23B 31/26, 31/117*
See application file for complete search history.

(56) References Cited

U.S. PATENT DOCUMENTS 3,823,642 A * 7/1974 Jerue ........................ 409/233

5,425,606 A * 6/1995 Kelch ........................ 409/233

FOREIGN PATENT DOCUMENTS

| DE | DL 217460 A1 | * | 1/1985 |
| DE | 3801509 A1 | * | 7/1989 |
| DE | 4308738 A1 | * | 9/1994 |
| JP | 05050359 A | * | 3/1993 |
| JP | 2004114232 A | * | 4/2004 |
| SU | 476101 A | * | 10/1975 |
| SU | 1038171 A | * | 8/1983 |

* cited by examiner

*Primary Examiner*—Daniel W. Howell
(74) *Attorney, Agent, or Firm*—Rosenberg, Klein & Lee (57) ABSTRACT

A spindle of a machining center is equipped with a clutch, which is fitted to a main spindle housing, and directly connected to a power source for separable engagement with a shaft coupling sleeve, and which is guided by sloping guiding trenches of a clutch disk such that a pull rod of the spindle is actuated for a tool shank housing to be changed between a clamped position and a released one; thus, power of the power source can be usually provided to the spindle to effect rotation of the spindle for machining a work piece, and the clutch can be operated for allowing the pull rod to be directly actuated with power of the power source without hydraulic mechanisms.

3 Claims, 15 Drawing Sheets

STRUCTURE OF A SPINDLE OF A MACHINING CENTER

BACKGROUND OF THE INVENTION

1. Field of the Invention

The present invention relates to a spindle of a machining center, more particularly one, which is structured in such a way that tool releasing and clamping operations can be actuated by means of a clutch, which is connected to the power source, as well as other parts instead of hydraulic mechanisms, and that the number of coil springs used in the spindle can be reduced.

2. Brief Description of the Prior Art

Figure 14:
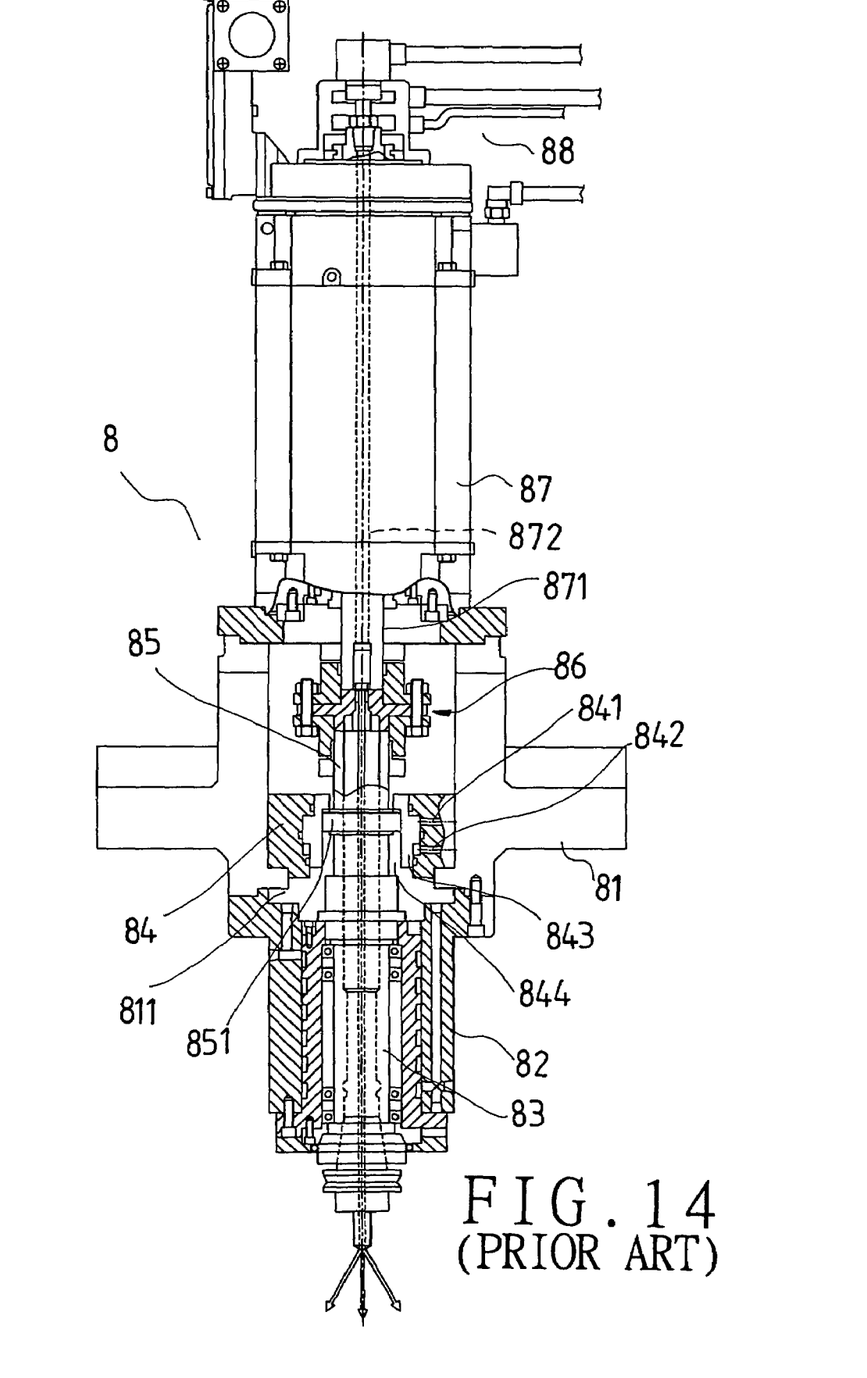
FIG. 14 is a first view of the first conventional spindle of a machining center.
Figure 15:
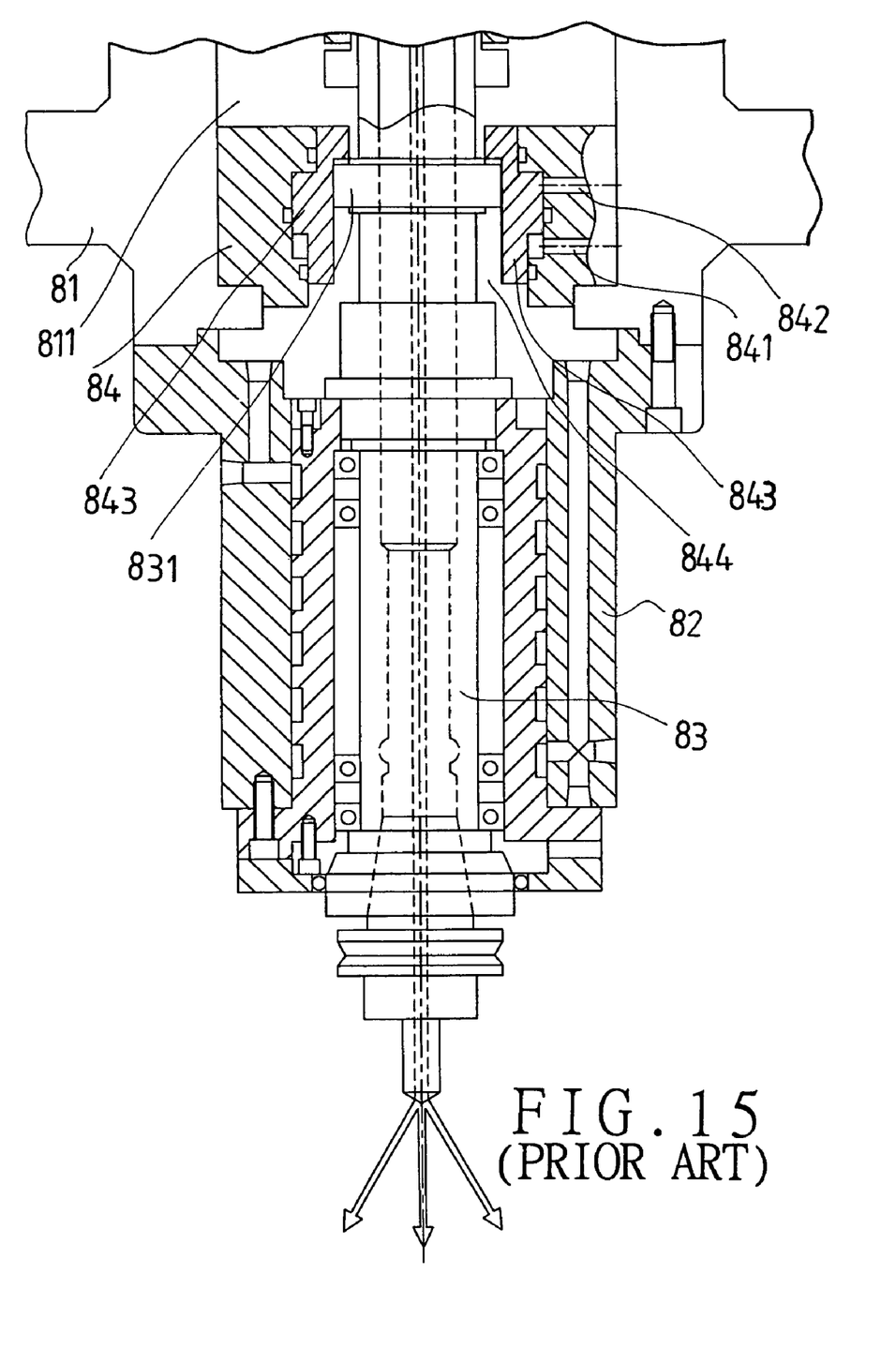
FIG. 15 is a second view of the first conventional spindle.

Referring to FIGS. 14 and 15, a conventional spindle 8 of a machining center includes a spindle seat 81, a spindle housing 82, a hydraulic mechanism 84, a pull rod 85, a power source 87, and a main spindle housing 83 fitted in position with the help of both the spindle seat 81 and the spindle housing 82. Oil passages 841, 842 of the hydraulic mechanism 84 are fitted in internal holes 811 of the spindle seat 81 such that a piston 843 can be actuated by means of the hydraulic mechanism 84, which piston 843 is connected to a ring protrusion 851 of the pull rod 85 at a central hole 844 thereof for making the pull rod 85 move together with it. In addition, a shaft coupling device 86 is connected to an upper end of the spindle seat 81, and an output shaft 871 of the power source 87; the output shaft 871 has a through hole 872, which communicates with a rotary connecting head 88 arranged at other end of the power source 87 such that cooling water can be supplied through the pull rod 85 when the machining center is in operation.

From the above description, it can be understood that the hydraulic mechanism 84 is the only mechanism used for actuating the pull rod 85, and movement of a tool shank housing 89 between a clamping position and a releasing one. And, the hydraulic mechanism is difficult to install, repair, and maintain because the oil passages 841, 842 thereof are hidden deep inside the internal holes 811 of the spindle seat 81. Consequently, the spindle is neither efficient nor convenient to use.

Furthermore, in order to use the hydraulic mechanism, the spindle has to be equipped with additional hydraulic units and controlling devices whose cost is relatively high. And, oil leaking and staining is likely to happen, and cost of maintenance of the spindle will increase. Moreover, the spindle will stop functioning when power failure or breakdown of the hydraulic mechanism happens accidentally. Therefore, there will be many problems if a hydraulic mechanism is used as power source for actuating the pull rod of the spindle of a machining center.

Figure 16:
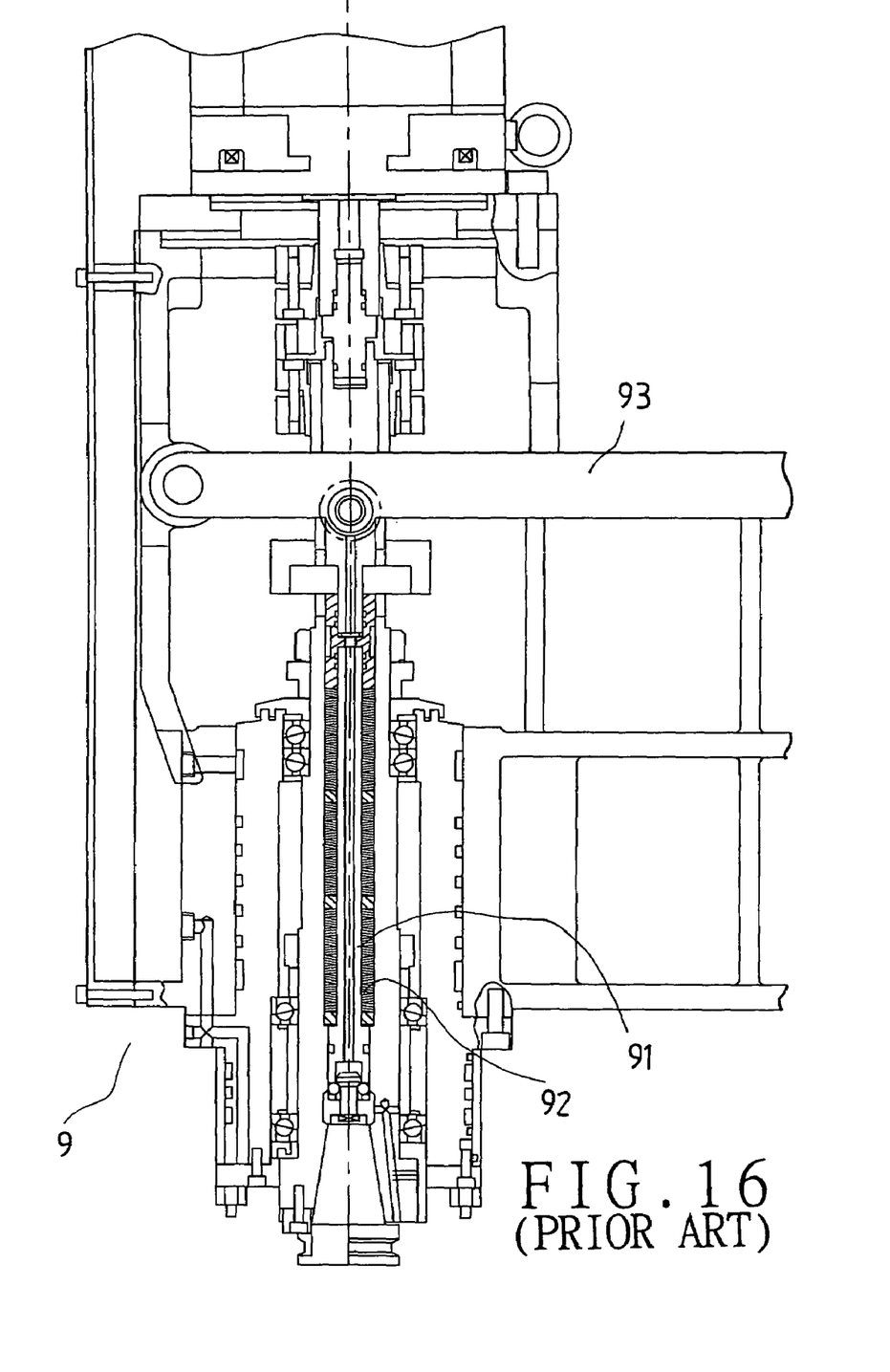
FIG. 16 is a view of the second conventional spindle.

Referring to FIG. 16, in order to provide enough elastic force and proper clamping force, another conventional spindle 9 of a machining center is equipped with several coiled springs 92 around a pull rod 91 thereof. In the spindle, a push rod 93 is pivoted to an upper end of the pull rod 91, and a power source is connected to the other end of the push rod 93 so that power of the power source can be passed on to the pull rod 91 through the push rod 93 to effect up and down movement of the pull rod 91, i.e. to move the pull rod 91 between upper and lower positions, in which positions the pull rod 91 will respectively clamp, and release the tool shank housing. However, because displacement and change of length of each coil springs 92 are too small as compared with the distance of displacement of the pull rod 91, there have to be many coil springs 92 arranged around the pull rod 91 to be nearly half of the length of the pull rod 91 all together. Consequently, there will be more difficulty in assembling the spindle, noise and less balance in rotation of the spindle therefore the above structure is not suitable for machining centers of high-speed type.

SUMMARY OF THE INVENTION

It is a main object of the present invention to provide a spindle of a machining center to overcome the above disadvantages.

The spindle of the present invention has a clutch, a main spindle housing, which is directly connected to the clutch at the power input end thereof, and operable with the help of the clutch disk. A claw clutch is directly connected to the power source instead of hydraulic systems for passing on power to the tool shank housing for the same to change from a released position to a clamped position and vice versa; thus, inertia of the whole transmission system of the spindle can be reduced, and it takes less time to accelerate the spindle. There are fewer coiled springs fitted around the pull rod of the present spindle than the pull rods of conventional spindles. Because no hydraulic system is used in the present spindle, there won't be any disadvantage of hydraulic systems in using the spindle, e.g. waste of power and consumption of extra energy, undesirable effects of high temperature hydraulic oil on machine precision, and cost of maintenance.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
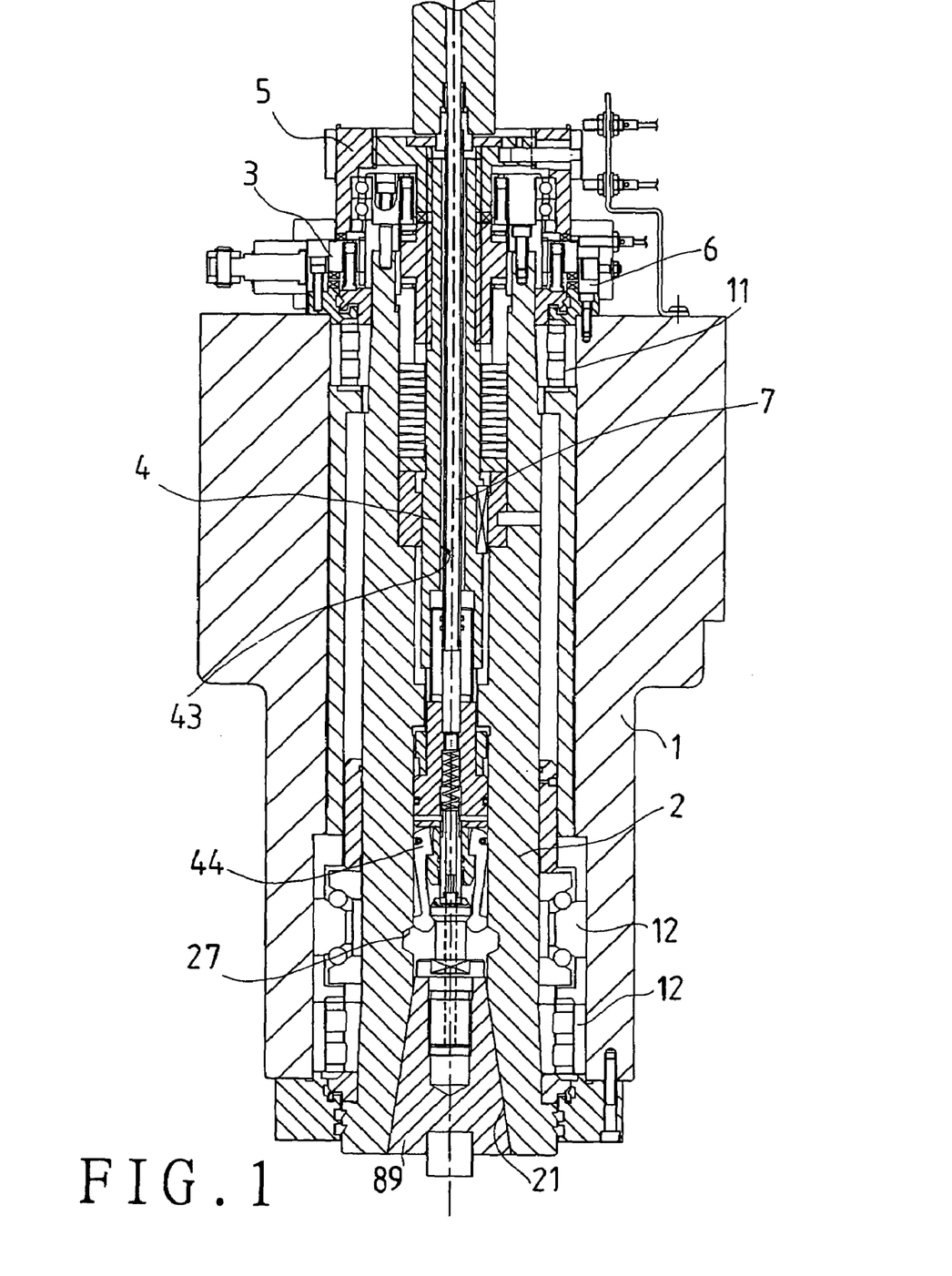
FIG. 1 is a view of a section of the spindle of a machining center according to the present invention, parallel to the axis.

Referring to FIG. 1, a preferred embodiment of a spindle of a machining center in the present invention includes a spindle seat 1, a main spindle housing 2, a clutch 3, a pull rod 4, a claw clutch 5, a cam ring seat 6, and a guide tube 7.

Figure 2:
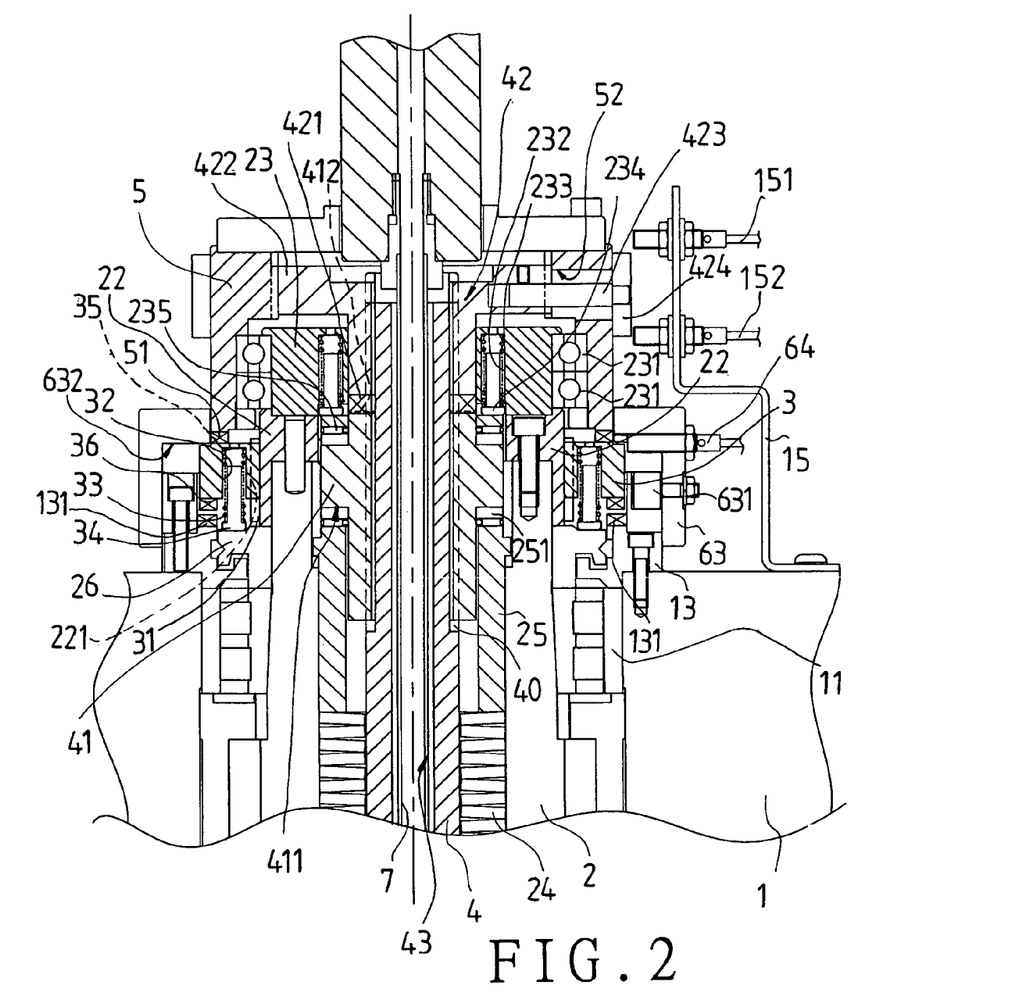
FIG. 2 is a first partial cross-sectional view of the spindle according to the present invention.
Figure 3:
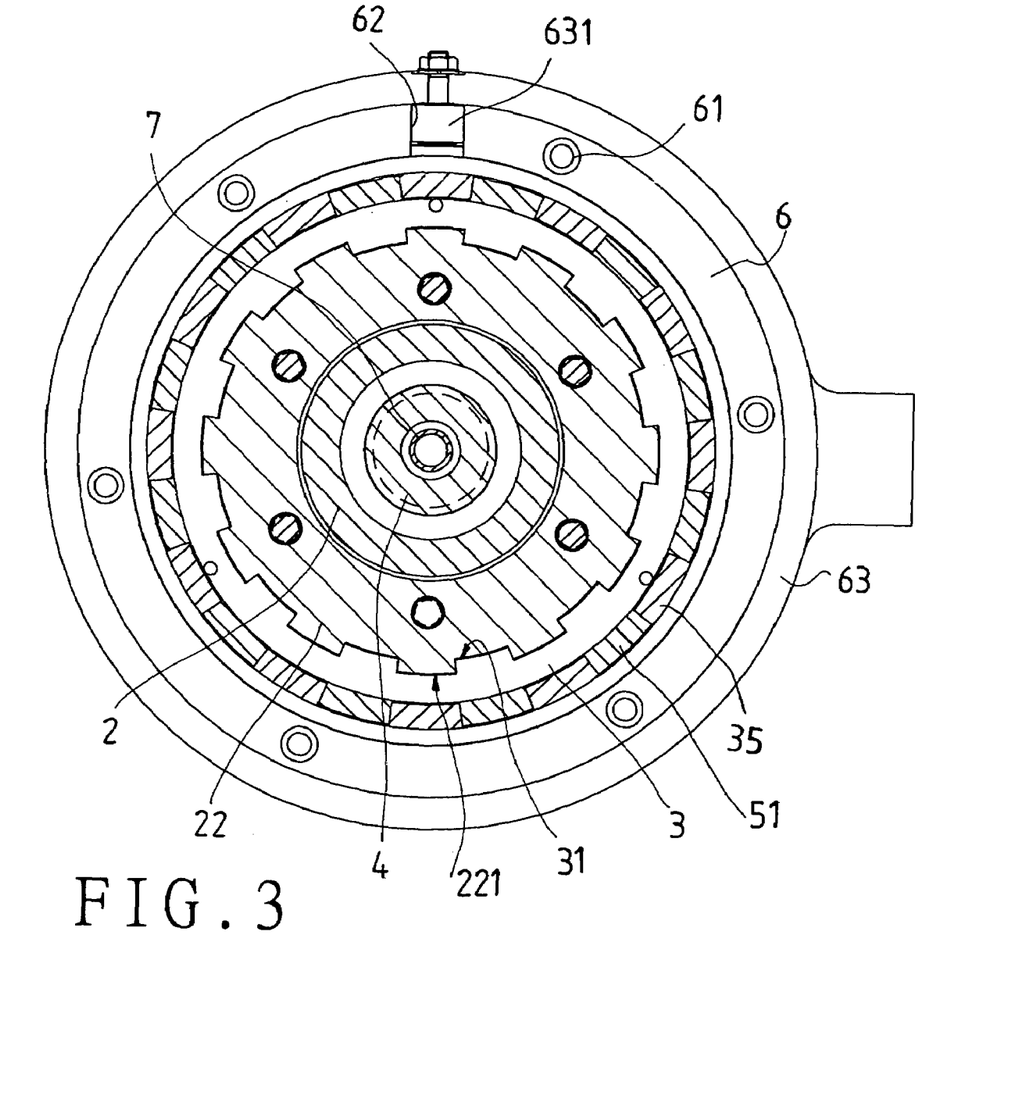
FIG. 3 is a view of a first section of the present spindle, perpendicular to the axis.

Referring to FIGS. 1 to 3, the spindle seat 1 has several axial holes, and bearings 11, and 12 fitted onto the axial holes.

The main spindle housing 2 is fitted to the bearings 11, and 12, and has a cone-shaped hole 21 at a lower end for connection with a tool shank housing 89. The main spindle housing 2 has a shaft coupling 22, and a bearing support 23 at an upper end, and has coiled springs 24, and a moving spacer ring 25 held therein. External spline keys 221 are arranged outsides the shaft coupling 22 for movable connection with internal spline keys 31 of the clutch 3. In addition, a spacing element 26 is arranged between the shaft coupling 22 and the bearing 11. The bearing support 23 has a bearing 231 fitted on outer side thereof, and is formed with several cavities 232 therein, to which a spring 233, and a push rod 234 are fitted. There are thrust bearings 235, 251 disposed between an edge of the push rod 234 and an upper edge of the moving spacer ring 25, which thrust bearings 235, 251 are respectively pressed against upper and lower ends of a protrusion 411 of a lower pull rod bolt sleeve 41.

The clutch 3 has several cavities 32 formed therein, and several springs 33, and a push rod 34 are fitted to the cavities 32 such that the push rod 34 is pressed against an upper edge of the spacing element 26 at an edge thereof, and such that the clutch 3 is upwards biased by elastic force. The clutch 3 is formed with upper and lower engaging teeth 35, and 36 on upper and lower ends thereof such that it can be separably engaged with engaging teeth 131 of a fixing ring 13 fixed on a top of the spindle seat 1 at the lower engaging teeth 36 thereof, as shown in FIGS. 2, 3, 6, 11, and 12, and such that it can be separably engaged with an engaging claw 51 of the claw clutch 5 at the upper engaging teeth 35 thereof, which claw clutch 5 is fitted to the bearing 231.

Figure 7:
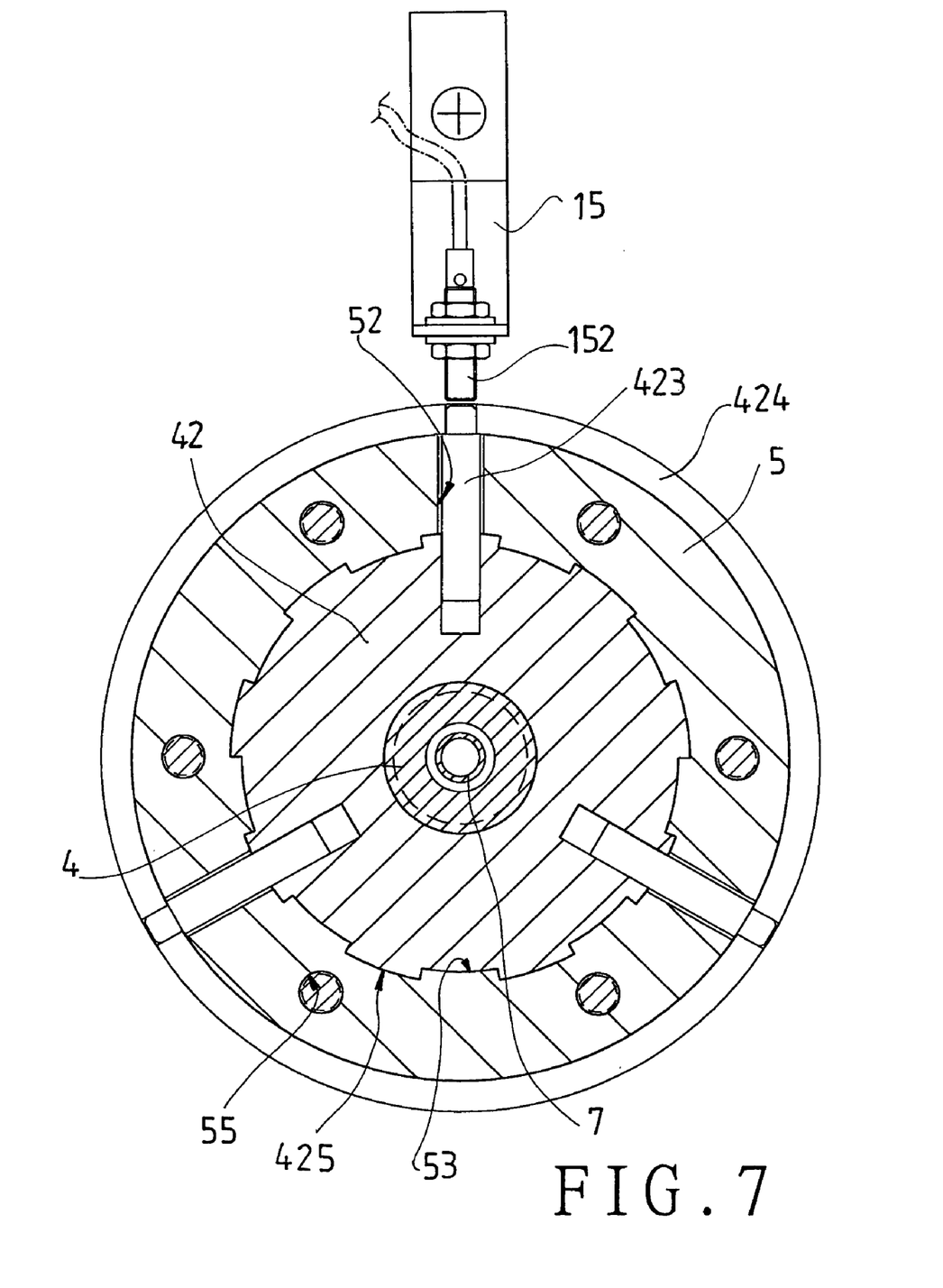
FIG. 7 is a view of a fourth section of the present spindle, perpendicular to the axis.
Figure 8:
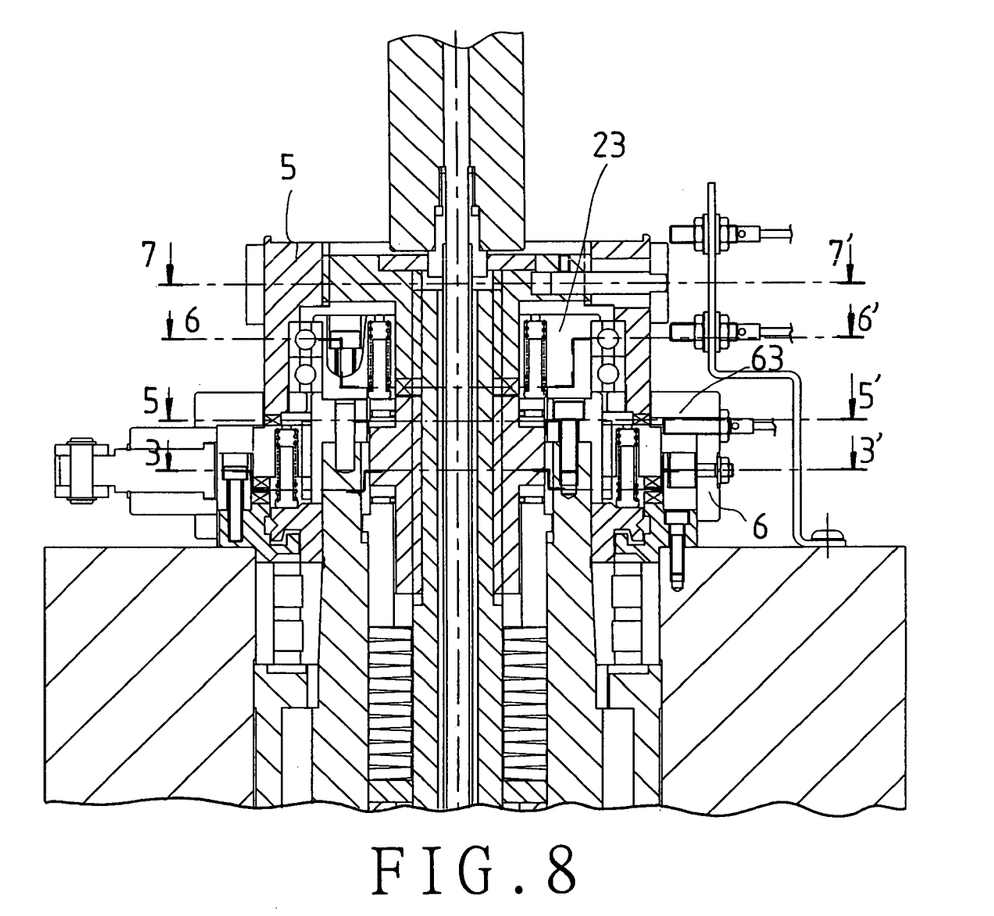
FIG. 8 is a view of a section of the parts of the present spindle in FIGS. 3, 5, 6, and 7, parallel to the axis.
Figure 9:
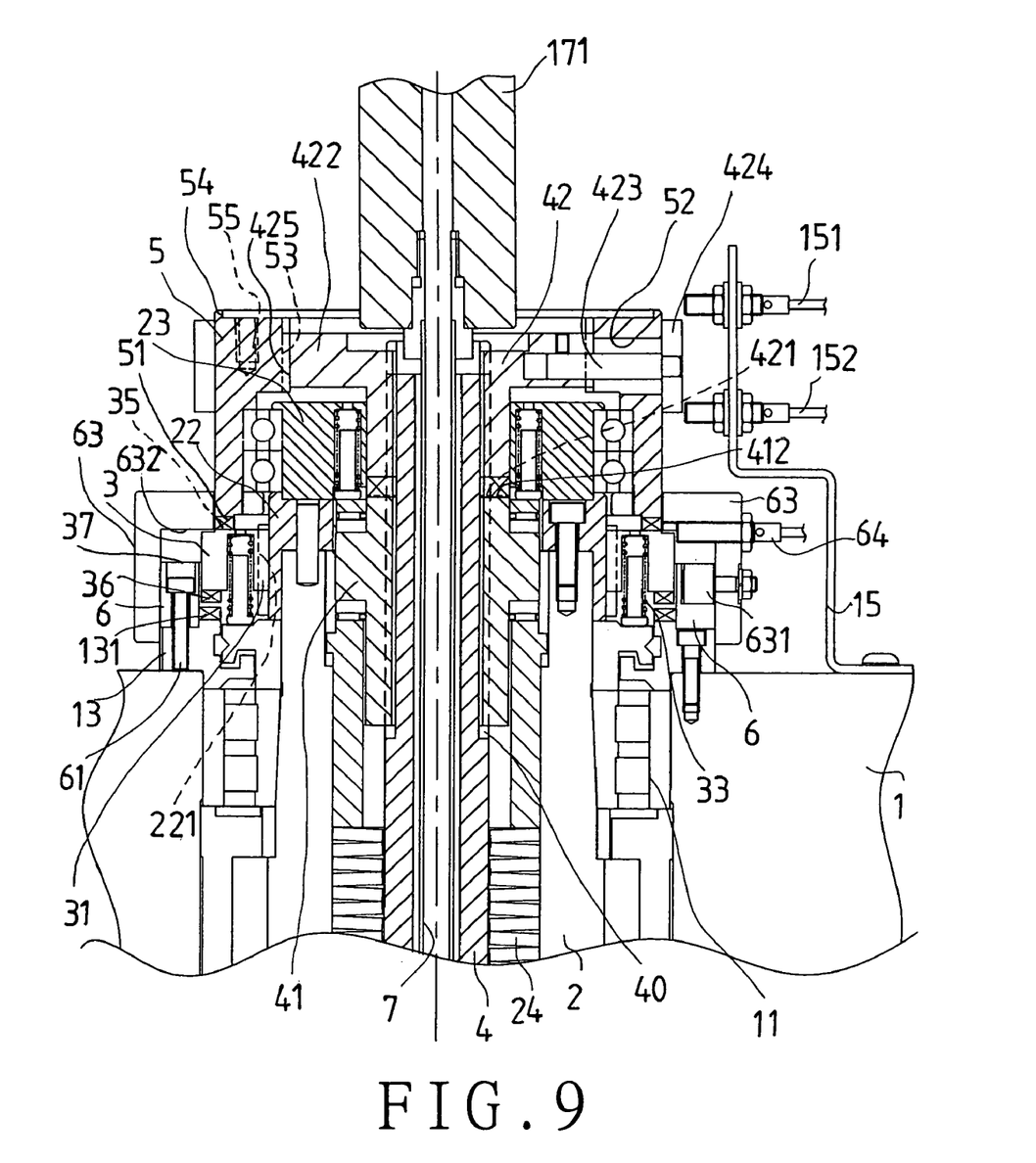
FIG. 9 is a second partial cross-sectional view of the spindle according to the present invention.

Referring to FIGS. 1 to 3, and 5 to 9, the pull rod 4 has threaded portion 40 at an upper end thereof, on which threads are formed with such shape as to be capable of bearing relatively large force, e.g. trapezoid shape, and which is used for connection with the lower pull rod bolt sleeve 41 as well as an upper pull rod bolt sleeve 42 at a same time. The pull rod 4 is formed with a central hole 43, through which the guide tube 7 is passed. The upper and the lower pull rod bolt sleeves 42, and 41 are respectively formed with engaging claws 421, and 412, which can engage each other to prevent the upper and the lower pull rod bolt sleeves 42, and 41 from being displaced relative to each other. The upper pull rod bolt sleeve 42 has a protrusion 422, and is movably passed into the claw clutch 5 at the protrusion 422; the protrusion 422 has several equidistantly spaced insertion pins 423 fitted on an outward side thereof, which is movably passed into straight elongated holes 52 of the claw clutch 5, and then projected from the claw clutch 5. A detection ring 424 is securely joined to outward ends of the insertion pins 423, as shown in FIGS. 7 and 9. Furthermore, referring to FIG. 1, there is a clamping claw 44 securely joined to a lower end of the pull rod 4, which clamping claw 44 will change between a releasing position and a clamping position where it clamps the tool shank housing 89 while an inner concave ring 27 of the main spindle housing 2 is up and down moving along the pull rod 4.

Besides the straight elongated holes 52 and the engaging claws 51, the claw clutch 5 has internal spline keys 53, which can be movably connected with external spline keys 425 of the upper pull rod bolt sleeve 42. The claw clutch 5 further has a locating ring 54, and a screw hole 55 on upper side, which is directly connected to a power source 17 or a transmission wheel such that power can be supplied to the claw clutch 5, as shown in FIGS. 9, 11, and 12.

Referring to FIGS. 3, 4, 9, and 10, the cam ring seat 6 is securely connected to the fixing ring 13 by means of bolts 61, and arranged outside the clutch 3. The cam ring seat 6 is formed with several sloping guide trenches 62 therein while a clutch disk 63 is arranged outside the cam ring seat 6, and equipped with guide wheels 631, which are passed into the sloping guide trenches 62. The clutch disk 63 is equipped with a detecting device 64 thereon, and is faced with the upper edge of the clutch 3 at an inner edge 632 thereof, as shown in FIG. 9. Moreover, referring to FIG. 10, the clutch disk 63 has an ear protrusion 633, to which an output shaft 651 of a power rod 65 is pivoted. The power rod 65 can be an air cylinder or a power mechanism of linear movement type, and is pivoted to an ear protrusion 14, which is secured on the spindle seat 1, at the other end thereof, thus being capable of making the clutch disk 63 rotate (FIGS. 4 and 9) as well as moving up and down to make the clutch 3 change between a first position, wherein the clutch 3 is disengaged from the fixing ring 13 (or the claw clutch 5) and a second position, wherein the clutch 3 is engaged with the fixing ring 13 (or the claw clutch 5) with the help of the guide wheels 631 and the sloping guide trenches 62.

In addition, the spindle seat 1 is equipped with a support unit 15 at an upper portion thereof, and upper and lower detecting devices 151, and 152 are fitted on the support unit 15 to respectively face upper and lower ends of the detecting ring 424 (FIG. 2).

Figure 11:
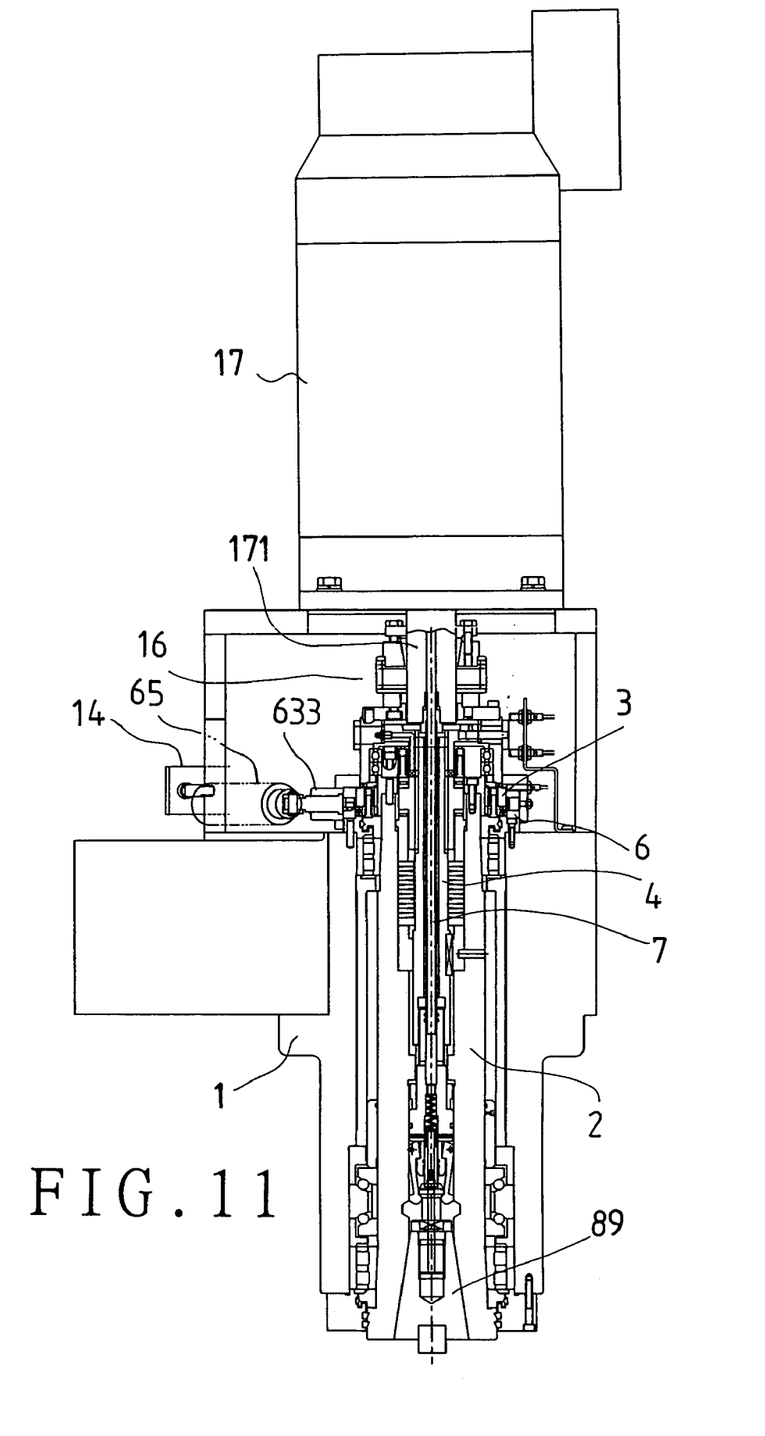
FIG. 11 is a view of the present spindle.
Figure 12:
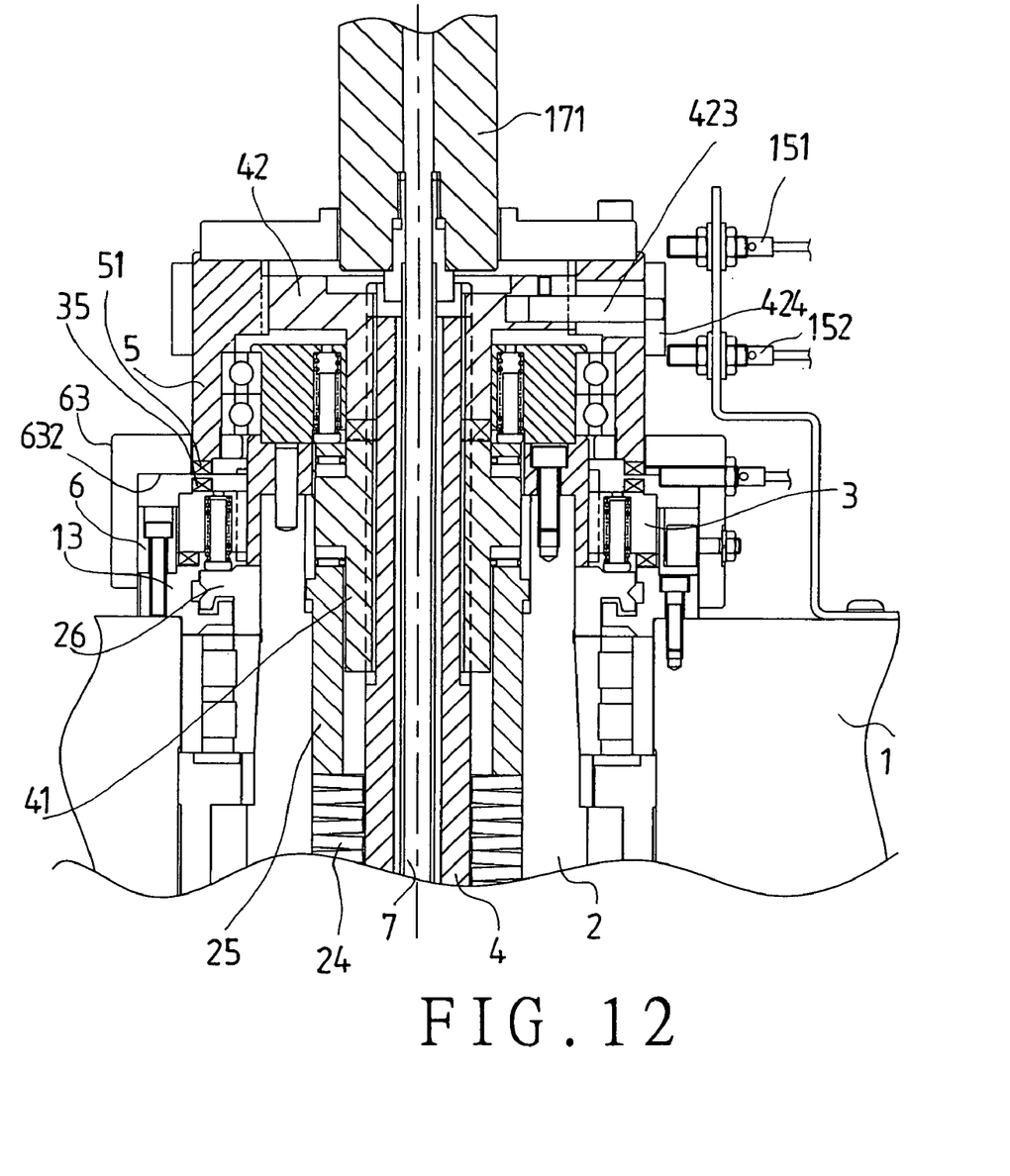
FIG. 12 is a view of the present spindle in operation (in clamping position)

Referring to FIGS. 9, 11, and 12, a shaft coupling 16 is securely joined to the locating ring 54 of the claw clutch 5, and securely connected to an output shaft 171 of the power source 17 such that power of the power source 17 can be directly provided to the claw clutch 5, thus making the claw clutch 5 rotate as well as rotating the main spindle housing 2 and the tool shank housing 89, which is secured to the lower end of the main spindle housing 2.

The engaging claw 51, and the internal spline keys 53 of the claw clutch 5 are respectively used for engaging the upper engaging teeth 35 of the clutch 3, and the external spline keys 425 of the upper pull rod bolt sleeve 42. When the engaging claw 51 is engaged with the upper engaging teeth 35, the clutch 3 will rotate together with the claw clutch 5. On the other hand, when the engaging claw 51 is disengaged from the upper engaging teeth 35, as shown in FIG. 12, the main spindle housing 2 will be secured in position, and the power source 17 will make the upper pull rod bolt sleeve 42 rotate; thus, the lower pull rod bolt sleeve 41 is rotated accordingly, and downwards displaced to push the moving spacer ring 25 as well as to exert force on the coiled springs 24, and the pull rod 4 is downwards displaced to pull the clamping claw 44, thus making the clamping claw 44 release the tool shank housing 89 for allowing the tool replacement mechanism of the machining center to operate for tool replacement.

When the pull rod 4 is downwards displaced, the detection ring 424 will also be pulled to move downwards by the insertion pins 423, and in turns, the lower detecting device 152 will detect presence of the detection ring 424 owing to contact of the bottom of the detection ring 424 with the lower detecting device 152. Thus, the power source 17 will stop rotating when the clamping claw 44 releases the tool shank housing 89 completely.

Figure 13:
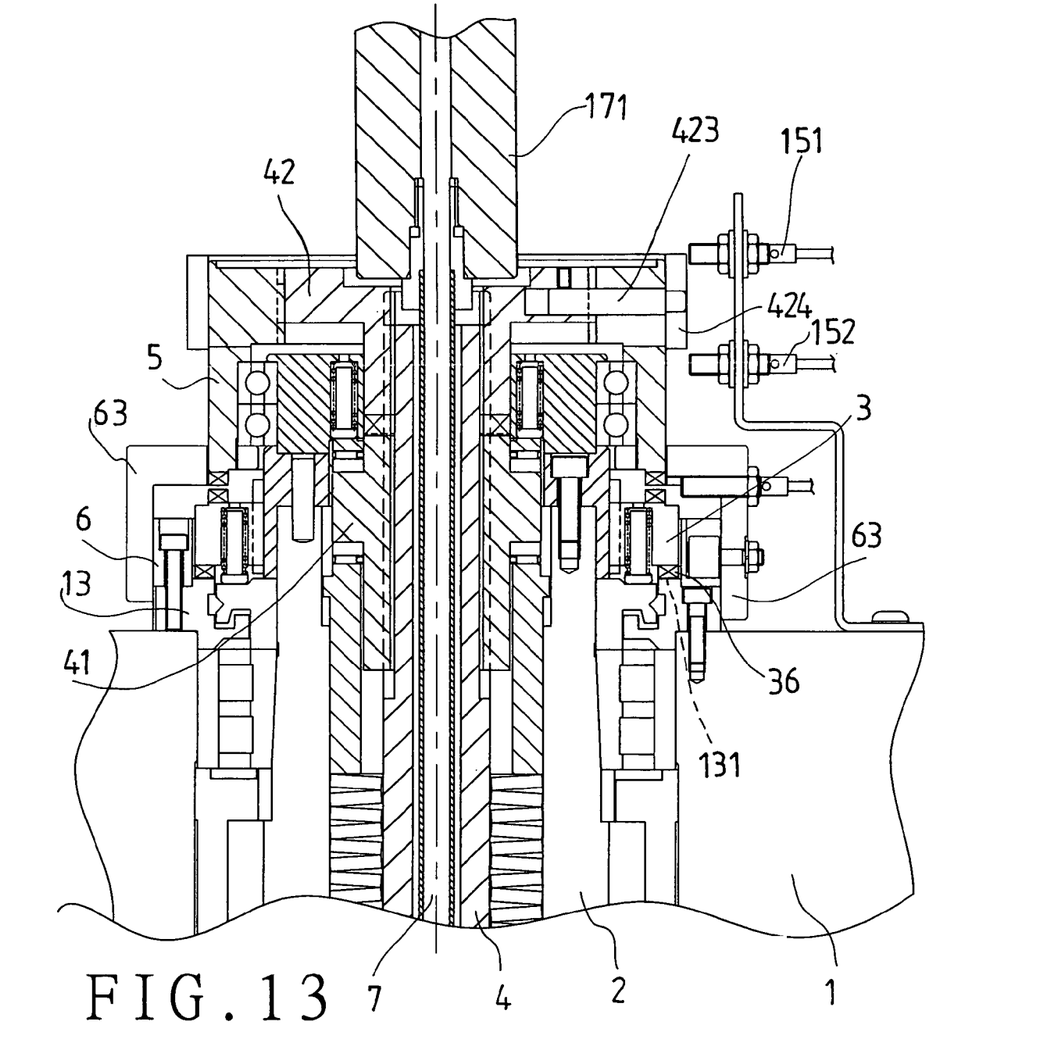
FIG. 13 is a view of the present spindle in operation (in releasing position)

On the other hand, when the power source 17 is made to rotate in the opposite direction, the upper and the lower pull rod bolt sleeves 42, and 41 will be turned accordingly, and gradually upwards displaced; thus, the pull rod 4 moves upwards together with the bolt sleeves 42 and 41, and the clamping claw 44 is pulled upwards to clamp and secure the tool shank housing 89, which has just been inserted back into the clamping claw 44. At the same time, the detection ring 424 is upwards moved with the help of the insertion pins 423, and in turns, the upper detecting device 151 will detect presence of the detection ring 424 owing to contact of the top of the detection ring 424 with the upper detecting device 151. Thus, the power source 17 will stop rotating in the opposite direction when the clamping claw 44 clamps the tool shank housing 89 securely, as shown in FIG. 13.

Figure 4:
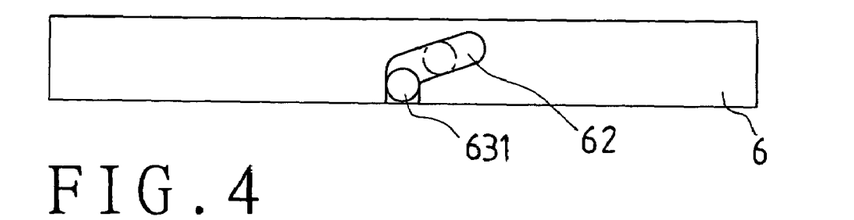
FIG. 4 is a partial top view of the present spindle.
Figure 5:
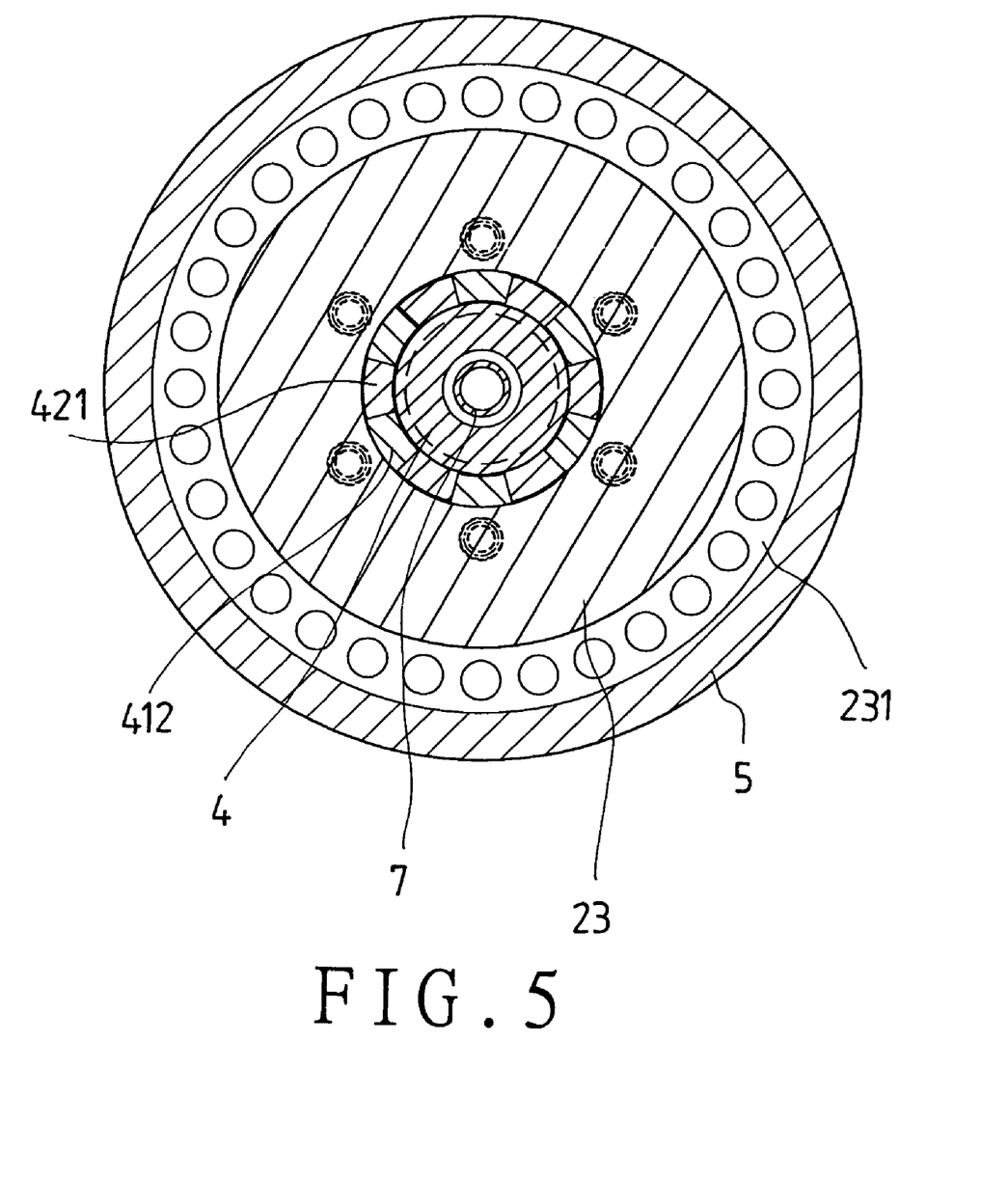
FIG. 5 is a view of a second section of the present spindle, perpendicular to the axis.
Figure 6:
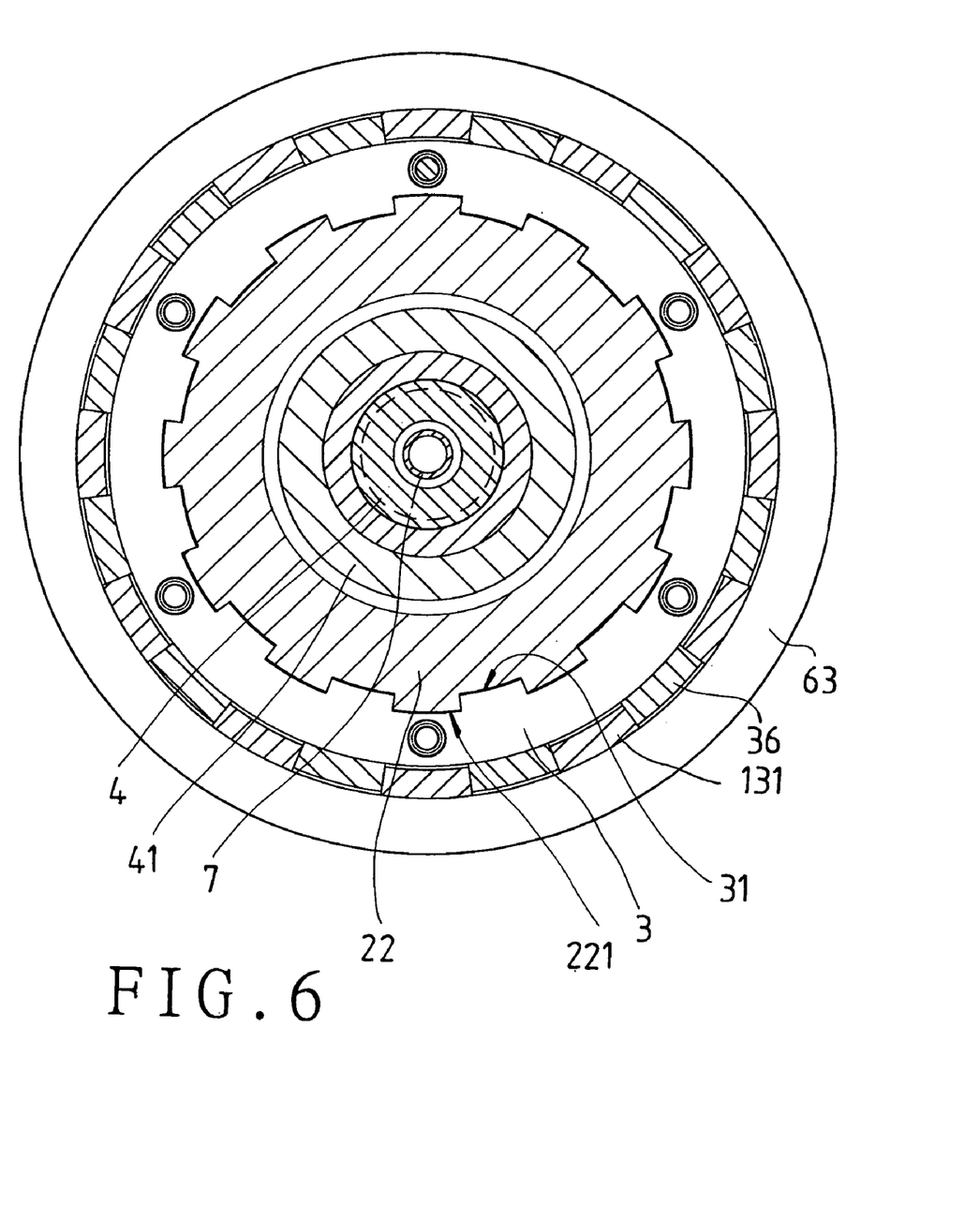
FIG. 6 is a view of a third section of the present spindle, perpendicular to the axis.
Figure 10:
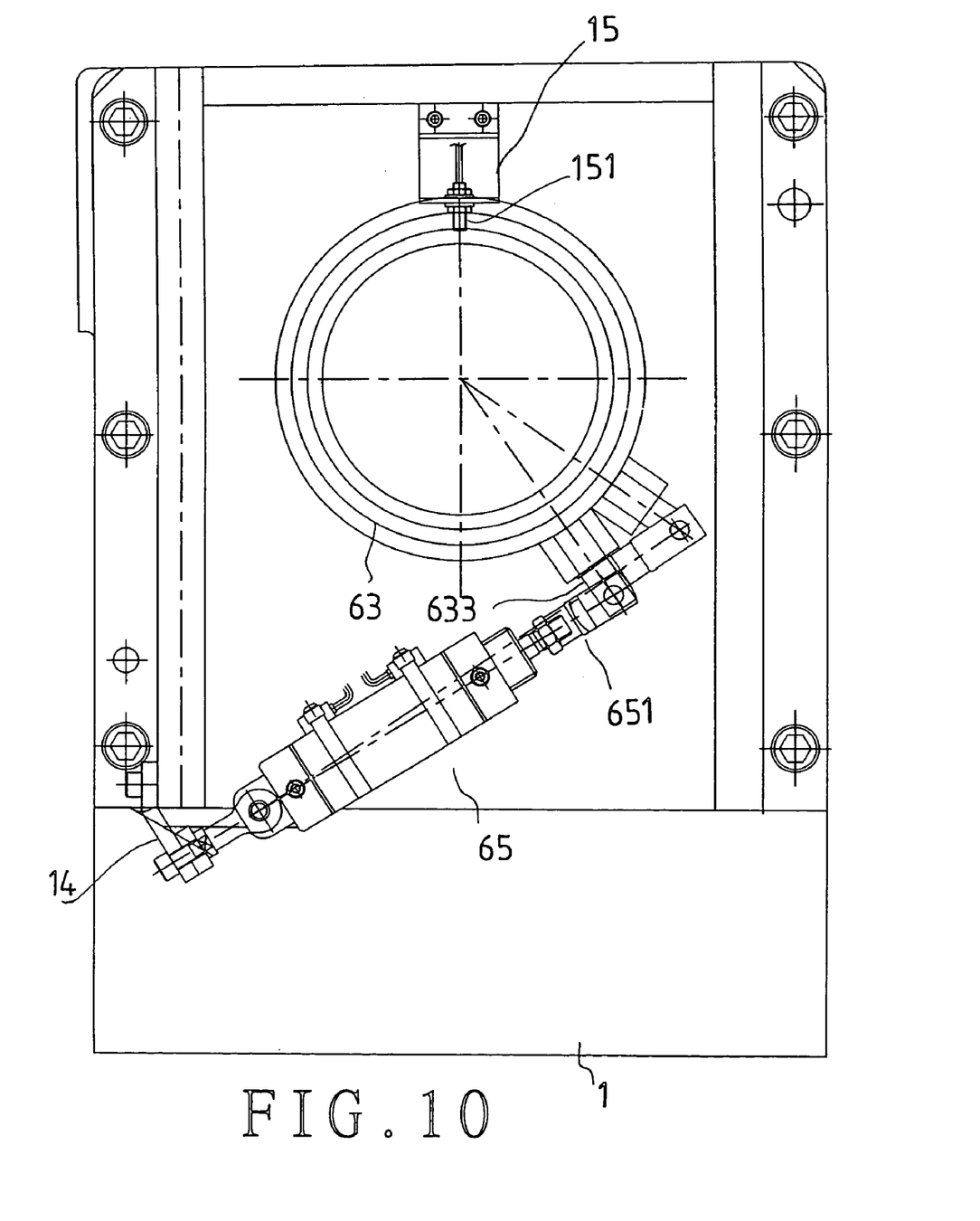
FIG. 10 is a view of an end of the present spindle

Referring to FIGS. 4 and 10, when the clutch disk 63 is rotated by means of the power rod 65 pivoted to the ear protrusion 14, it will be guided to move upwards, and in turns, the clutch disk 63 isn't pressed against the clutch 3 any longer, and the clutch 3 is upwards displaced by means of the springs 33. Thus, the lower engaging teeth 36 are separated from the engaging teeth 131 of the fixing ring 13 (FIG. 9), the upper engaging teeth 35 comes into engagement with the engaging claw 51 of the claw clutch 5, and the detecting device 64 detects presence of the clutch 3 owing to contact of the top of the clutch 3 with the detecting device 64. Consequently, the power source 17 works to rotate the claw clutch 5, the main spindle housing 2, and the pull rod 4, and in turns, a tool fitted to the tool shank housing 89 is moved accordingly, and a work piece is machined, as shown in FIGS. 1 and 2.

Rotation of the main spindle housing 2 will be stopped after machining of the work piece is finished. And, the clutch disk 63 will be rotated to make the clutch 3 move downwards with the inner edge 632 thereof being pressed against the upper edge 37 of the clutch 3 by means of reverse rotation of the power rod 65; thus, the clutch 3 gets back into engagement with the engaging teeth 131 of he fixing ring 13 at the lower engaging teeth 36 thereof, and secured in position. And, the pull rod 4 becomes capable of being pulled for allowing the clamping claw 44 to clamp and release the tool shank housing 89, as shown in FIG. 13. When the clamping claw 44 clamps the tool shank housing 89, the coiled springs 24 will be compressed by relatively large force, and help the tool shank housing 89 to be securely held in position.

From the above description, it can be easily understood that the spindle of a machining center of the present invention has advantages as followings:

1. Because the main spindle housing 2 is directly connected to the clutch at the power input end thereof, and operable with the help of the clutch disk, the claw clutch, which is directly connected to the power source, can pass on power to the tool shank housing for the same to change from a released position to a secured position and vice versa. Consequently, it will save the users time to use the present invention.
2. Because the tool shank housing is operated with the help of the power source of the spindle of the present invention instead of conventional hydraulic systems, inertia of the whole transmission system of the spindle can be reduced, and it takes less time to accelerate the spindle. Therefore, the present invention is very efficient.
3. In the present spindle, there are fewer coiled springs used for operating the pull rod than conventional spindles while large elastic force is provided. Therefore, the present invention is easier to assemble.
4. Because no hydraulic system is used in the present spindle, there won't be any disadvantage of hydraulic systems in using the spindle, e.g. waste of power and consumption of extra energy, undesirable effects of high temperature hydraulic oil on machine precision, and cost of maintenance.
5. The pull rod can be effectively and precisely operated whichever position it is in because the spindle seat and the clutch disk respectively have several detecting devices fitted thereon, which can detect both movement and position of the clutch.

What is claimed is:

1. A spindle of a machining center, comprising
  a spindle seat equipped with a plurality of bearings therein;
  a main spindle housing fitted to the bearings and formed with a cone-shaped hole on an power output end thereof for allowing insertion of a tool shank housing therein, by which tool shank housing a tool is clamped;
  a pull rod held in the main spindle housing and having a clamping claw at an power output end thereof; the clamping claw being used together with an inner concave ring of the main spindle housing for clamping the tool shank housing; the clamping claw having a central hole, in which a guide tube is held; and
  a cam ring seat;
  the main spindle housing having a shaft coupling, and a bearing support at an upper end, and having a plurality of coiled springs, and a moving spacer ring held therein; external spline keys being arranged outside the shaft coupling for movable connection with internal spline keys of a clutch; a spacing element being arranged between the shaft coupling and a first one of the bearings of the spindle seat; the bearing support having a bearing fitted on outer side thereof; the bearing support being formed with a plurality of cavities therein, to which a spring, and a push rod are fitted; first and second thrust bearings being disposed between an edge of the push rod and an upper edge of the moving spacer ring; the first and the second thrust bearings being respectively pressed against upper and lower ends of a protrusion of a lower pull rod bolt sleeve;
  the clutch having a plurality of cavities formed therein; a plurality of springs, and a push rod being fitted to the cavities in the clutch such that the push rod is pressed against an upper edge of the spacing element at an edge thereof, and such that the clutch is upwards biased by elastic force; a claw clutch being fitted to the bearing connected to the bearing support; the clutch being formed with upper and lower engaging teeth respectively on upper and lower ends thereof such that it can be separably engaged with engaging teeth of a fixing ring, which is fixed on a top of the spindle seat, at the lower engaging teeth thereof, and such that it can be separably engaged with an engaging claw of the claw clutch at the upper engaging teeth thereof;
  the pull rod having a threaded portion at an upper end thereof for connection with the lower pull rod bolt sleeve as well as an upper pull rod bolt sleeve at a same time; the upper and the lower pull rod bolt sleeves being respectively formed with engaging claws, which can engage each other to prevent the upper and the lower pull rod bolt sleeves from being displaced relative to each other; the upper pull rod bolt sleeve having a protrusion, and being movably passed into the claw clutch at the protrusion thereof; the protrusion having a plurality of equidistantly spaced insertion pins fitted on an outward side thereof, which is movably passed into plural straight elongated holes of the claw clutch, and then projected from the claw clutch; a detection ring being securely joined to outward ends of the insertion pins;

the claw clutch having, besides the straight elongated holes and the engaging claws, internal spline keys for movable connection with external spline keys of the upper pull rod bolt sleeve; the claw clutch having a locating ring, and a screw hole on an upper side thereof;

the cam ring seat being securely connected to the fixing ring by means of bolts, and arranged outside the clutch; the cam ring seat being formed with a plurality of sloping guide trenches therein, and having a clutch disk arranged outside it; the clutch disk being equipped with guide wheels, which are passed into the sloping guide trenches; the clutch disk being equipped with a detecting device thereon, and being faced with an upper edge of the clutch at an inner edge thereof; the clutch disk having an ear protrusion, to which an output shaft of a power rod is pivoted; the power rod being pivoted to an ear protrusion, which is secured on the spindle seat, at other end thereof;

whereby the power rod can make the clutch disk to rotate when being in operation, and the clutch disk will, when rotating, be made to change position at a same time with help of the sloping guide trenches of the cam ring seat, thus making the clutch change between an upper engaging position and a lower releasing position, and the claw clutch can, when being actuated by a power source, first change to an engaging position to cause displacement of the pull rod for the tool shank housing to be clamped, and then cause rotation of the main spindle housing for machining a work piece, and then cause release of the tool shank housing, thus allowing the pull rod to be operated with the power source instead of hydraulic mechanisms.

2. The spindle of a machining center as claimed in claim 1, wherein the claw clutch is directly connected to the power source with help of the locating ring, and the screw hole thereof.

3. The spindle of a machining center as claimed in claim 1, wherein the spindle seat has a support unit on an upper side thereof, and upper and lower detecting devices are fitted on the support unit, and face upper and lower ends of the detection ring respectively.

* * * * *